Figure 1:
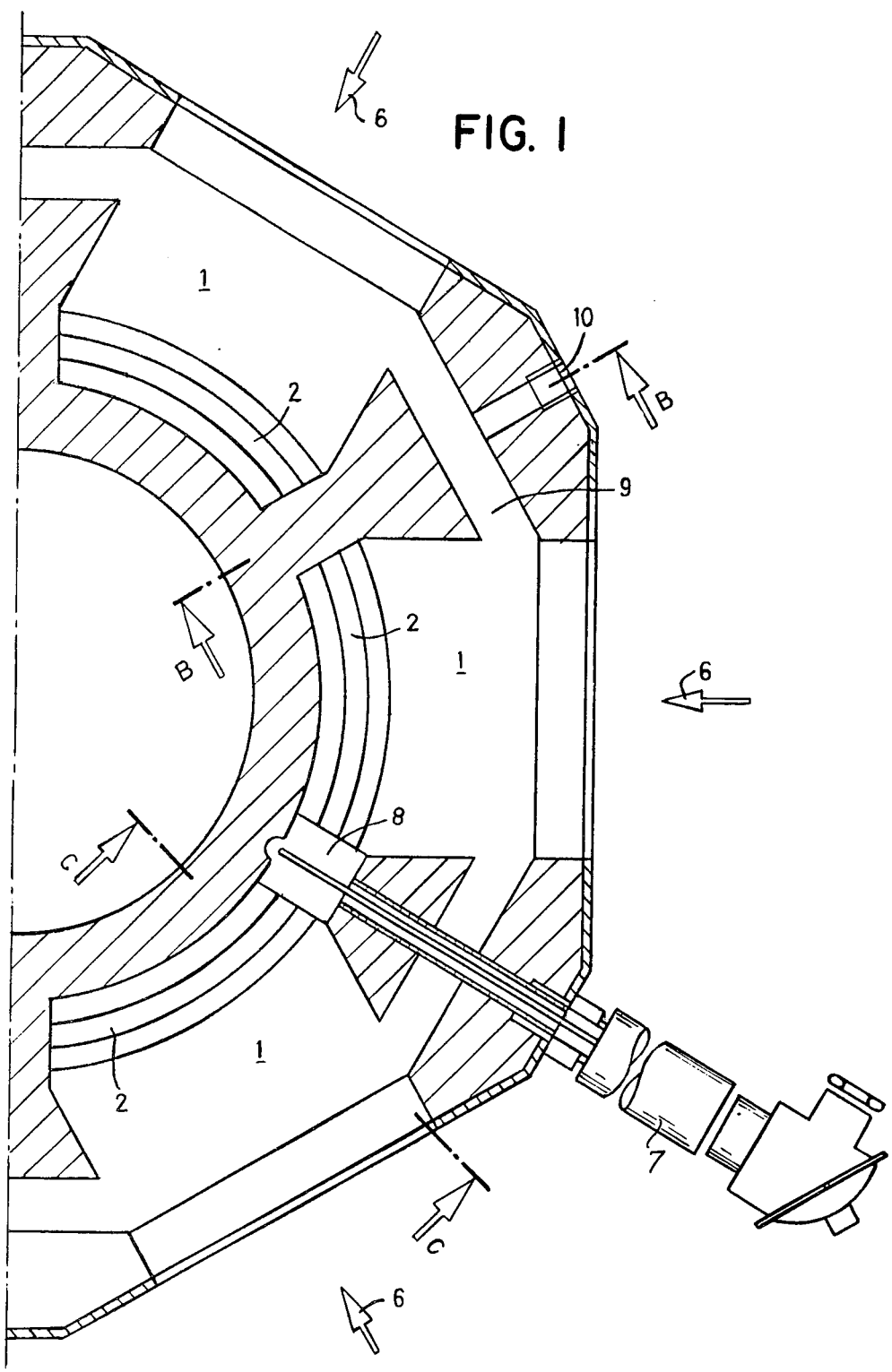

United States Patent [19]

Sistermann et al.

[11] 4,263,034

[45] Apr. 21, 1981

[54] METHOD AND APPARATUS FOR CONTROL OF FIBERIZATION OF THERMOPLASTIC MATERIAL

[75] Inventors: Klaus Sistermann, Römerberg; Hans Gärtner, Dannstadt-Schauernheim, both of Fed. Rep. of Germany

[73] Assignee: Saint-Gobain Industries, France

[21] Appl. No.: 94,168

[22] Filed: Nov. 14, 1979

[30] Foreign Application Priority Data

Nov. 14, 1978 [DE] Fed. Rep. of Germany ........ 2849357

[51] Int. Cl.³ ............................................. C03B 37/04
[52] U.S. Cl. ............................................. 65/6; 65/5; 65/14; 65/16; 431/285
[58] Field of Search ............................. 65/5, 16, 6, 14; 431/285

[56] References Cited

U.S. PATENT DOCUMENTS

| 3,350,184 | 10/1967 | Porter | 65/14 |
| 3,395,005 | 7/1968 | Stelmalor | 65/5 |
| 3,936,286 | 2/1976 | Dunkailo | 65/14 |

Primary Examiner—Robert L. Lindsay, Jr.
Attorney, Agent, or Firm—John T. Synnestvedt; Kenneth P. Synnestvedt

[57] ABSTRACT

A process and apparatus for controlling the operating conditions, particularly the temperature and pressure, of attenuating gas employed in the fiberization of thermoplastic materials. The arrangement disclosed provides for temperature and pressure controls of the hot attenuating gas blast used in connection with a centrifugal or spinner type of technique for making fibers from thermoplastic mineral materials such as glass.

9 Claims, 3 Drawing Figures

METHOD AND APPARATUS FOR CONTROL OF FIBERIZATION OF THERMOPLASTIC MATERIAL

This invention relates to control of the operating conditions in fiber attenuating techniques, for regulating or influencing the properties of fibers being produced, such as the diameter, length or the like, in the production of such fibers from thermoplastic material, and especially in the production of mineral fibers, such as glass, by attenuation of molten thermoplastic material by means of a hot accelerated high velocity gaseous blast produced particularly by a plurality of burners. The invention is concerned with measurement of the gas temperature, the measured value being used for regulating the operation of the gaseous blast-producing burners.

In the implementation of such a process disclosed in U.S. Pat. No. 3,395,005 for example, using a specific apparatus, thermocouples are provided downstream of the burners and at the outlet of an annular combustion chamber, which thermocouples control the valves mounted in the supply of the combustion air and the combustible fuel. Both thermocouples are mounted in the path of the hot combustion gases emerging from the burners and therefore disturb the flow of the combustion products and of the gaseous blast that influences fiber properties, and this is especially true with respect to the thermocouple mounted at the outlet.

Even with the arrangement of the prior patent above referred to, the rate of discharge, especially at the outlet of the combustion chamber, is still non-uniform, and therefore is even less controllable when the outlet of the combustion chamber is narrowed to slot form in order to effect acceleration of the hot discharging gaseous blast. In practice therefore, in order to avoid interference with the hot emerging gases which resulted from placing the measuring device at critical locations, one had to rely on volume control of the fuel and air. Such a gas-air volume control has several disadvantages. In the actual setup for determining the specific pressure and temperature values, the required theoretical values for gas and air volume have to be determined experimentally. For this purpose, manual temperature and pressure measurements must be made in the burner discharge slot in continuous fiber production. It is difficult to accurately measure the pressure and temperature of the gaseous blast at the burner outlet which is only a few millimeters wide; this also holds true for continuous temperature measurements as used in U.S. Pat. No. 3,395,005. This in turn resulted in production losses and maladjustment of the burners, due to the inaccuracy of the measurements. Fluctuations in the heating value of the gases are not stabilized and this technique therefore results in fluctuations in pressure and temperature.

Since production must be interrupted to start up the burner, there is the danger of not waiting long enough after a start up for thermal balance to be reinstated. As a result, the temperature and pressure values are further altered without this being compensated for by the volume control.

Fluctuation in pressure and temperature cannot be eliminated by using vaporized liquid gas and controllably varying the gas/air mixture. Moreover, even if this was done, the resulting regulation of the heating value would not be uniform because of the consequent difference in density and variable oxygen content, which influence the pressure and temperature in the burner without offsetting compensation by the volume control.

Values that fluctuate or deviate from the desirable values of pressure and temperature for the gaseous blast in an apparatus in which a centrifugal device or spinner is used in combination with the hot gaseous blasts emerging from burners, diminish the quality of the fibers, produce waste and reduce the life of the spinner.

Since according to U.S. Pat. No. 3,395,005, no pressure control whatsoever is provided, the indicated problems cannot be solved by controlling the process in said U.S. patent.

It is a major objective of the present invention to overcome the foregoing problems in a novel manner and with novel equipment, by which it is made possible to continuously and accurately influence the properties of the fibers produced from thermoplastic material, such as the diameter and length of the fibers, and to accomplish this without appreciable adverse effect on the attenuating blast of the hot accelerated high velocity gases by the control devices used to establish the desired pressure and temperature.

This major objective is achieved in accordance with the invention by the use of control devices which measure the temperature and preferably also the pressure of the gases in regions of the combustion products lying between individual burners.

It has been shown that the temperature and pressure values in the combustion chamber are closely proportional to the pressure and temperature values at the discharge lip of the burner, this being true whether or not the burner is annular. In view of this pressure and temperature values can be determined continuously in the combustion chamber, instead of at or in the discharge slot, and these measured values can be used to regulate the blast producing equipment.

One apparatus for implementing the process in accordance with the invention includes, in the usual manner, at least two adjacently positioned burners or burner chambers for production of hot gaseous blasts which are accelerated to high velocities by means of the nozzles provided on the burners and characterized in that connecting channels are provided between the burners or burner chambers. Therefore, in a further expansion of the invention, it is particularly advantageous that the channel containing the temperature measuring device be positioned in closer proximity to the discharge nozzle than the channel provided for measurement of pressure.

With the process of the invention and the apparatus proposed for its implementation, it is possible to determine pressure and temperature values in the combustion chamber measurable on an ongoing basis without appreciable timelag and proportional to the corresponding values at the combustion discharge slot, and these pressure and temperature values and therefore the corresponding values of the gaseous blast at the burner outlet can be regulated independently in that temperature and pressure are affected by the volume of air supplied and the volume of gas supplied to the burner. Therefore, in this manner, in the field necessary for its technical application, the pressure of the gaseous blast, the discharge velocity of the gaseous blast and therefore the micron size of the formed fibers can be modified by maintaining a constant and optimal temperature without interruption in production.

During production stoppages, temperature shocks to the fiber-forming apparatus, which were unavoidable in the prior art, do not occur with the technique of the invention, because the temperature of the discharged blast is controllably reduced at the time of stoppages. Previously, such temperature shocks occurred in consequence of the feed of thermoplastic material at a lower temperature, while the temperature of the hot gaseous blast remained unchanged.

Furthermore, it is possible by means of the invention to automatically regulate the burner and bring it to the desired temperature and pressure values, which also makes it possible to regulate the overall starting and stopping of the fiber-forming apparatus. Consequently, the operators are unburdened, production time is gained, especially when several devices have to be started up simultaneously, as is customary, and, finally, damage through improper handling is avoided.

Figure 2:
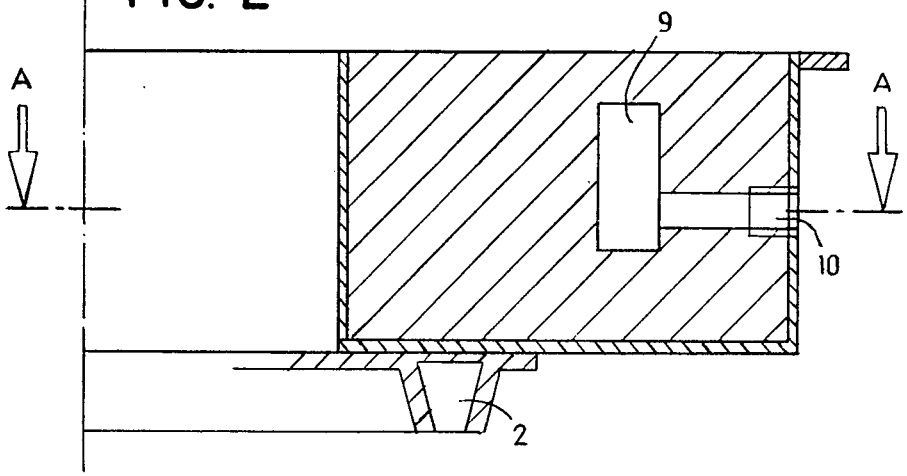
Figure 3:
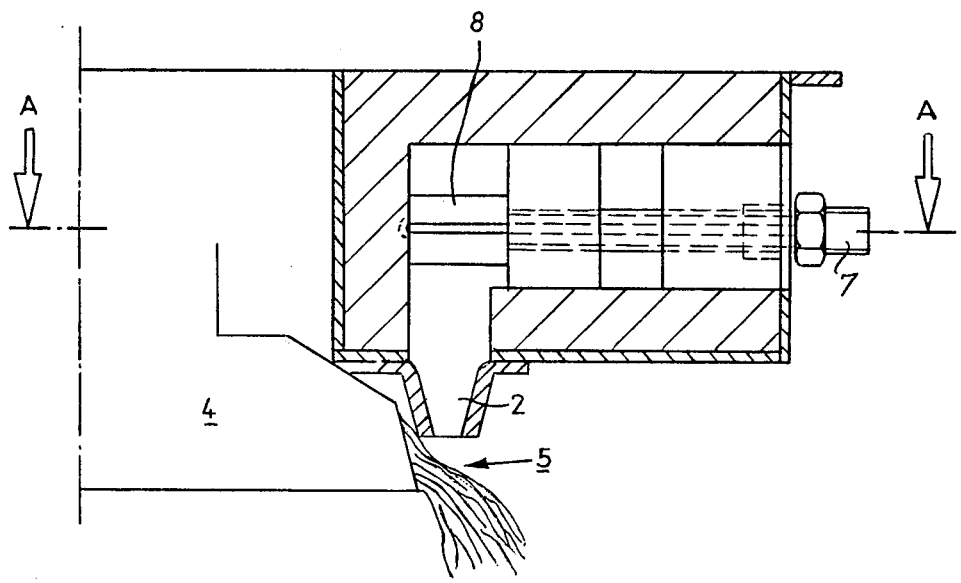

The drawings show:

FIG. 1—A horizontal section of half of an annular burner, the other half of which is not shown for simplification of the drawing;

FIG. 2—A vertical sectional view along line B—B of FIG. 1;

FIG. 3—A vertical sectional view along line C—C of FIG. 1.

In both of FIGS. 2 and 3 a section line A—A has been applied, indicating the plane of the horizontal section of FIG. 1.

The annular burner shown in the drawing contains combustion chambers 1, which are preferably distributed at regular angular intervals throughout the annular burner and terminate in a gas discharge nozzle or slot 2; this discharge nozzle being directed toward the fiber-forming moltem streams 5, for example molten glass streams, which emerge from a spinner, as shown diagrammatically at 4 in FIG. 3.

Each combustion chamber 1 is supplied with a gas-air mixture, as schematically indicated by the arrow 6, which burns in the combustion chamber so that hot combustible gases are delivered from the discharge nozzle 2 and attenuate the glass streams 5 into fine fibers which are then collected into mats on a collection device (not shown) located under the annular burner.

A thermocouple, indicated at 7 in FIGS. 1 and 3, extends into a connecting channel 8 and thereby measures the temperature between the flames in the adjacent combustion chambers 1. As seen, particularly in FIG. 1, the sensing element of the thermocouple 7 extends through a surrounding sleeve in the region from the exterior of the burner to the chamber 8. Although the connecting channel 8 is in communication with the discharge slot 2, this channel establishes a zone upstream of the discharge nozzle interconnecting the adjoining combustion or burner chambers 1—1. This provides a zone in which the flames or combustion products of two burners adjoin each other; and the thermocouple 7 is positioned to measure the temperature in this zone. The measured temperature is taken into account in the regulation of the blast producing equipment, for instance in determining the air-fuel ratio.

Location of the thermocouple 7 in the channel 8 not only avoids undesired disturbance of the blast being discharged from the annular slot 2, but is also of advantage in that the temperature in the channel 8 is lower than in the discharge slot, and this is of importance in avoiding excessive deterioration or destruction of the thermocouple.

The adjoining burner chambers 1 are interconnected by channels such as indicated at 9 in FIGS. 1 and 2, these channels serving to equalize the pressure in the chambers around the annular burner structure. For the purpose of providing for measurement of the pressure, the invention contemplates the use of at least one pressure responsive device including a passage or port 10 communicating with one of the channels 9 through which provision is made for measurement of the pressure. In accordance with the invention, it is contemplated that such a pressure measurement be employed in combination with the temperature measurement effected by the thermocouple 7, in determining the desired regulation of the operation of the blast producing equipment. Any suitable pressure measurement device may be employed in association with the measurement passage 10. The construction of such devices is well known and forms no part of the invention, per se, but it is pointed out that according to the invention the measured pressure should be taken into account in the control of the blast producing equipment. For instance, the measured pressure may be taken into account in connection with the total amount of the air-gas mixture delivered to the chambers 1.

I claim:

1. Apparatus for use in fiberization of thermoplastic mineral material, such as glass, comprising a spinner for centrifugal delivery of streams of molten thermoplastic material, and gas blast attenuation means including an annular burner structure having an annular gas discharge orifice positioned to deliver an annular blast in a path surrounding the spinner to effect gas blast attenuation of the streams of molten material delivered from the spinner, the annular burner structure including at least two gas generating burner chambers in side-by-side relation for delivery of gases through the annular discharge orifice, a channel interconnecting said burner chambers and providing a zone in which the gases generated in said two chambers adjoin each other, and a temperature measuring device positioned in said zone.

2. Apparatus as defined in claim 1 and further including a second channel interconnecting said burner chambers and providing for equalization of pressure in said chambers, and means including a passage extended from said second channel to the exterior of the annular burner structure and providing for measurement of the pressure in said second channel.

3. Apparatus as defined in claim 2 in which said zone is located farther downstream than said second channel, with respect to direction of gas flow toward the discharge orifice.

4. Apparatus for use in fiberization of thermoplastic mineral material, such as glass, comprising a spinner for centrifugal delivery of streams of molten thermoplastic material, and gas blast attenuation means including an annular burner structure having an annular gas discharge orifice positioned to deliver an annular blast in a path surrounding the spinner to effect gas blast attenuation of the streams of molten material delivered from the spinner, the annular burner structure including at least two gas generating burner chambers in side-by-side relation for delivery of gases through the annular discharge orifice, a channel interconnecting said burner chambers for equalizing the pressure in said chambers, and means including a passage extended from said second channel to the exterior of the annular burner structure and providing for measurement of the pressure in said channel.

5. Process for controlling the properties of fibers, such as diameter, length or the like, in the production of such fibers from thermoplastic material, especially in the production of mineral fibers, by attenuation of molten thermoplastic material by means of a hot accelerated high velocity gaseous blast produced by burner equipment having at least two adjoining burners delivering hot gases to discharge nozzle means, and wherein the gas temperature is measured and the measured value is taken into account in the regulation of the blast producing equipment, characterized by establishing a zone upstream of the discharge nozzle means in which zone the gases from two burners adjoin each other, measuring the temperature of the gases in said zone, and using the measured temperature in the regulation of the blast producing equipment.

6. A process as defined in claim 5 and further including establishing a second zone in which the gases from the two burners adjoin each other, measuring the pressure of the gases in said second zone, and using the measured pressure in the regulation of the blast producing equipment.

7. A process as defined in claim 6 in which the first zone is spaced downstream of the second zone.

8. Apparatus for implementing the process in accordance with claim 5 in which at least two adjacently positioned burner chambers are provided for production of gaseous blasts which are accelerated to high velocities by means of the nozzle means, characterized in that at least one connecting channel is provided between the burner chambers, and means for measuring the temperatures in said channel.

9. Apparatus in accordance with claim 8, characterized by the provision of a second channel connecting the burner chambers, and a pressure measuring means associated with said second channel.

* * * * *